United States Patent
Dumant et al.

(10) Patent No.: US 9,817,851 B2
(45) Date of Patent: Nov. 14, 2017

(54) DYANMIC DATA-DRIVEN GENERATION AND MODIFICATION OF INPUT SCHEMAS FOR DATA ANALYSIS

(71) Applicants: Bruno Dumant, Verneuil sur Seine (FR); Yann Le Biannic, Suresnes (FR)

(72) Inventors: Bruno Dumant, Verneuil sur Seine (FR); Yann Le Biannic, Suresnes (FR)

(73) Assignee: Business Objects Software Ltd., Dublin (IE)

( * ) Notice: Subject to any disclaimer, the term of this patent is extended or adjusted under 35 U.S.C. 154(b) by 494 days.

(21) Appl. No.: 14/151,175

(22) Filed: Jan. 9, 2014

(65) Prior Publication Data

US 2015/0193477 A1 Jul. 9, 2015

(51) Int. Cl.
*G06F 17/30* (2006.01)
*H04L 29/08* (2006.01)
*G06F 17/00* (2006.01)

(52) U.S. Cl.
CPC .. *G06F 17/30292* (2013.01); *G06F 17/30289* (2013.01); *G06F 17/30297* (2013.01); *G06F 17/30557* (2013.01); *H04L 67/10* (2013.01)

(58) Field of Classification Search
CPC ......... G06F 17/30289; G06F 17/30292; G06F 17/30297; G06F 17/30557
USPC ...................................................... 707/609
See application file for complete search history.

(56) References Cited

U.S. PATENT DOCUMENTS

| | | | |
|---|---|---|---|
| 8,572,122 B2 | 10/2013 | Cras et al. | |
| 2006/0117057 A1 | 6/2006 | Legault et al. | |
| 2006/0167856 A1* | 7/2006 | Angele | G06F 17/30545 |
| 2007/0294208 A1 | 12/2007 | Chowdhary et al. | |
| 2008/0228695 A1* | 9/2008 | Sifry | G06F 17/30864 |
| 2010/0106747 A1 | 4/2010 | Honzal et al. | |
| 2010/0332510 A1 | 12/2010 | Gitai et al. | |
| 2011/0093486 A1 | 4/2011 | Lin et al. | |
| 2014/0095471 A1* | 4/2014 | Deshmukh | G06F 17/30463 707/714 |

FOREIGN PATENT DOCUMENTS

| | | | |
|---|---|---|---|
| EP | 2894575 | 7/2015 | ............. G06F 17/30 |
| WO | WO 2011/153227 A2 | 12/2011 | |

OTHER PUBLICATIONS

Communication and Search Report for related EPO Appl. No. 14004140.1-1951 dated Jun. 2, 2015; 10 pages.
Communication pursuant to Article 94(3) EPC re EPO Application No. 14004140.1-1951, dated May 30, 2016; 5 pages.

* cited by examiner

*Primary Examiner* — Kannan Shanmugasundaram
(74) *Attorney, Agent, or Firm* — Fish & Richardson P.C.

(57) ABSTRACT

The present disclosure describes methods, systems, and computer program products for dynamic generation and modification of input schemas. One computer-implemented method includes receiving event data from a data source with an event collector, the data source registered with the event collector to transmit event data to the event collector, transmitting the received event data for analysis, saving the transmitted event data, determining whether to create or update a business intelligence view, determining whether to create or update an input schema based on the saved event data, and providing, by a computer, an input schema describing how data is represented in the database to a query generation engine.

18 Claims, 5 Drawing Sheets

DYANMIC DATA-DRIVEN GENERATION AND MODIFICATION OF INPUT SCHEMAS FOR DATA ANALYSIS

BACKGROUND

In the current business intelligence (BI) market, there is an increasing need for dynamic, real-time data analysis using dashboards. Dashboards aggregate, focus, and/or present static or dynamic content to end users in a uniform and succinct manner to, among other things, increase task efficiency, identify positive and negative business and/or process trends, make data correlations, enhance data analysis, and improve presentation of the content to others. Dashboards also allow a convenient access location to present higher-level content and then to permit an end user to drill down into more low-level related content. End users are generally not permitted to create and/or enhance existing dashboards with current data; this responsibility is typically allocated to information technology (IT) specialists that author (e.g., prepare and update) dashboard data/content as well as manage underlying data structures (e.g., database views, schemas, etc.) used to provide dashboard data/content. IT specialist delays in updating dashboards and associated data on a timely basis can result in stale data that that can cause missed business opportunities and other negative repercussions for an organization.

SUMMARY

The present disclosure relates to computer-implemented methods, computer-readable media, and computer systems for dynamic generation and modification of input schemas. One computer-implemented method includes receiving event data from a data source with an event collector, the data source registered with the event collector to transmit event data to the event collector, transmitting the received event data for analysis, saving the transmitted event data, determining whether to create or update a business intelligence view, determining whether to create or update an input schema based on the saved event data, and providing, by a computer, an input schema to a query generation engine describing how data is represented in a database.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprising pre-processing the received event data before transmitting the event data for analysis.

A second aspect, combinable with any of the previous aspects, further comprising analyzing the transmitted event data to determine whether to create database tables to save the event data.

A third aspect, combinable with any of the previous aspects, further comprising creating or updating a business intelligence view.

A fourth aspect, combinable with any of the previous aspects, further comprising creating or updating an input schema.

A fifth aspect, combinable with any of the previous aspects, further comprising transmitting a query to a database, the query generated by the query generation engine based on an input schema associated with the received event data.

A sixth aspect, combinable with any of the previous aspects, further comprising translating a received query into a common query format to transmit to the query generation engine.

The subject matter described in this specification can be implemented in particular implementations so as to realize one or more of the following advantages. First, dynamic creation and modification of business intelligence meta-data (e.g., Business Objects "universes", database vendor specific business intelligence views) directly from received data is made possible. Second, all necessary data structures can be dynamically generated or modified as data is received and facts generated by applications and/or web sites. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
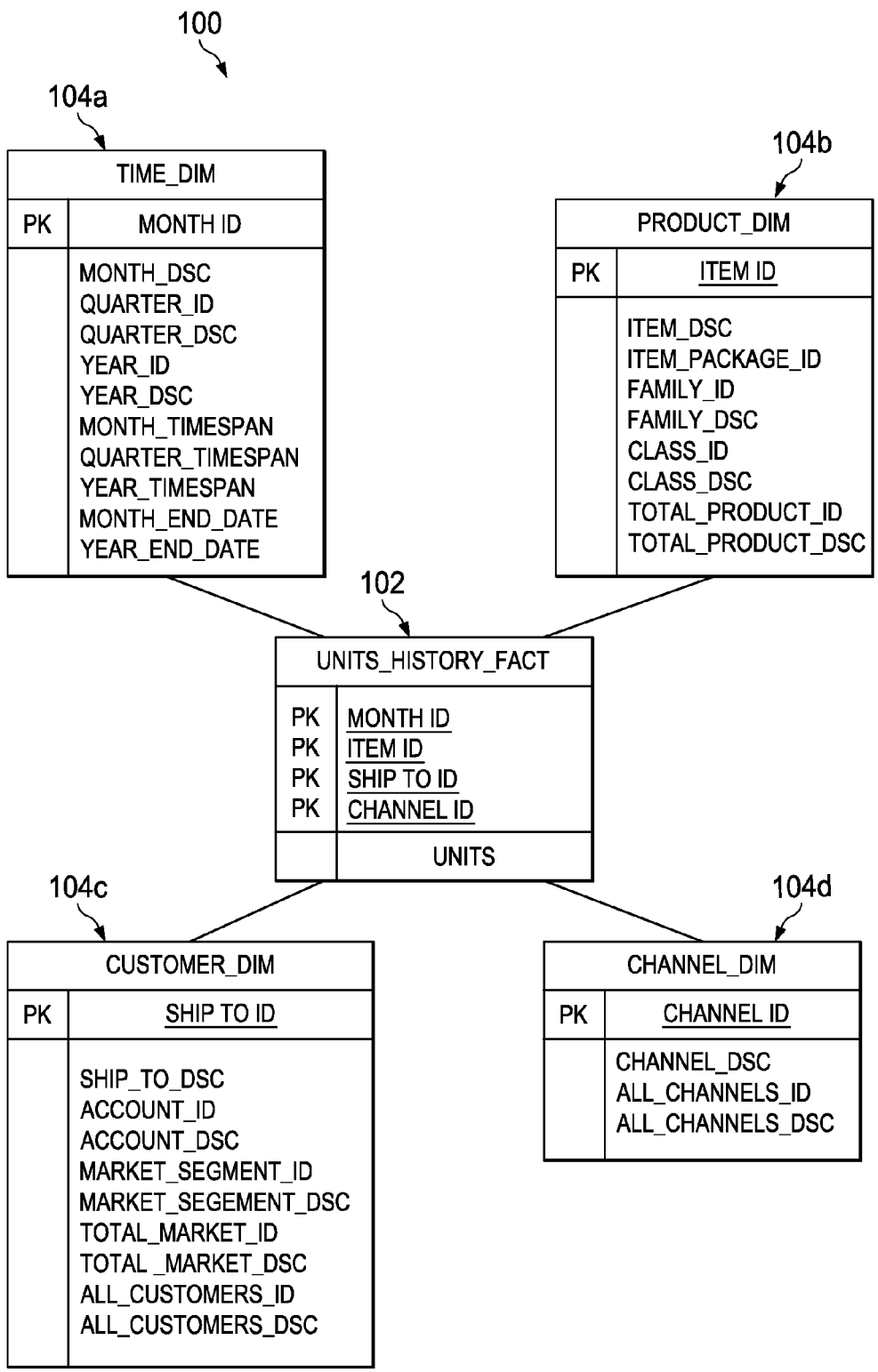
FIG. 1 is an illustration of an example input schema according to an implementation.

This disclosure generally describes computer-implemented methods, computer-program products, and systems for dynamic generation and modification of input schemas. The following description is presented to enable any person skilled in the art to make and use the invention, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

In the current business intelligence (BI) market, there is an increasing need for dynamic, real-time data analysis using dashboards to aggregate, focus, and/or present static or dynamic content end users in a uniform and succinct manner to, among other things, increase task efficiency, identify positive and negative business and/or process trends, make data correlations, enhance data analysis, and improve presentation of the content to others. Dashboards also allow a convenient access location to present higher-level content and then to permit an end user to drill down into more low-level related content. End users are generally not permitted to create and/or enhance existing dashboards with current data; this responsibility is typically allocated to information technology (IT) specialists that author (e.g., prepare and update) dashboard data/content as well as manage underlying data structures (e.g., database views, schemas, etc.) used to provide dashboard data/content. IT specialist delays in updating dashboards and associated data on a timely basis can result in stale data that that can cause missed business opportunities and other negative repercussions for an organization.

It is advantageous for data associated with a dashboard to be immediately available to end users for analysis and decision making. This disclosure describes reducing the number of steps between generation/collection of data and the ability to analyze the data as well as dynamic mechanisms to infer required data structures and metadata associated with dashboard data generated from various sources such as applications and web sites.

For the purposes of this disclosure, a "snowflake schema" is a database schema for storing received data that is multidimensional in nature and can be analyzed by any or all of a number of independent factors in a relational database. In some implementations, the snowflake schema (sometimes called snowflake join schema) consists of one fact table connected to many dimension tables, which can be connected to other dimension tables. The dimension tables contain information related to different attributes of the fact table, the attributes which are primary keys to associated dimension tables. The fact is an object described by the fact table and associated dimension tables. A diagram of the schema resembles a snowflake due to a single center point (fact table) branching out in many directions with dimension tables. Snowflake schemas normalize dimensions to eliminate redundancy. That is, the dimension data has been grouped into multiple tables instead of one large table. For example, a single product dimension table in a different schema might be normalized into dimension tables for time, product, customer, and channel table in a snowflake schema. In some implementations, the tables which describe the dimensions in the snowflake schema are in third normal form.

FIG. 1 is an illustration of an example database schema 100 according to an implementation. In this example, the database schema is configured as a snowflake schema. Fact table 102 exists in the middle of the snowflake schema 100. Several dimension tables 104a-d are attached to the fact table 102. Note that dimension tables 104a-d provide additional data related to the units history (e.g., time, product, customer, and channel) fact table. Events populate the fact tables, while dimension tables can be filled through an application programming interface (API) associated with an application and/or web site or data can come from external sources (e.g., on-premise information, CSV files, etc.). The snowflake schema 100 is queried by application analytics (AppA) 202 to return data for use in populating data dashboards/visualizations with data retrieved from the database. In one possible implementation, AppA will directly use SQL queries to retrieve data from the database; in other implementations, it can leverage a business intelligence subsystem (such as Business Objects, or database specific business intelligence views). Although this disclosure focuses on the use of a snowflake schema structure, those of ordinary skill in the art will realize that any appropriate data structure consistent with this disclosure can be used, in particular "star" schemas. Other appropriate data structures are considered to be within the scope of this disclosure. Also, although this disclosure discussed the subject matter in terms of dashboards, any appropriate data visualization is considered within the scope of the disclosure.

Figure 2:
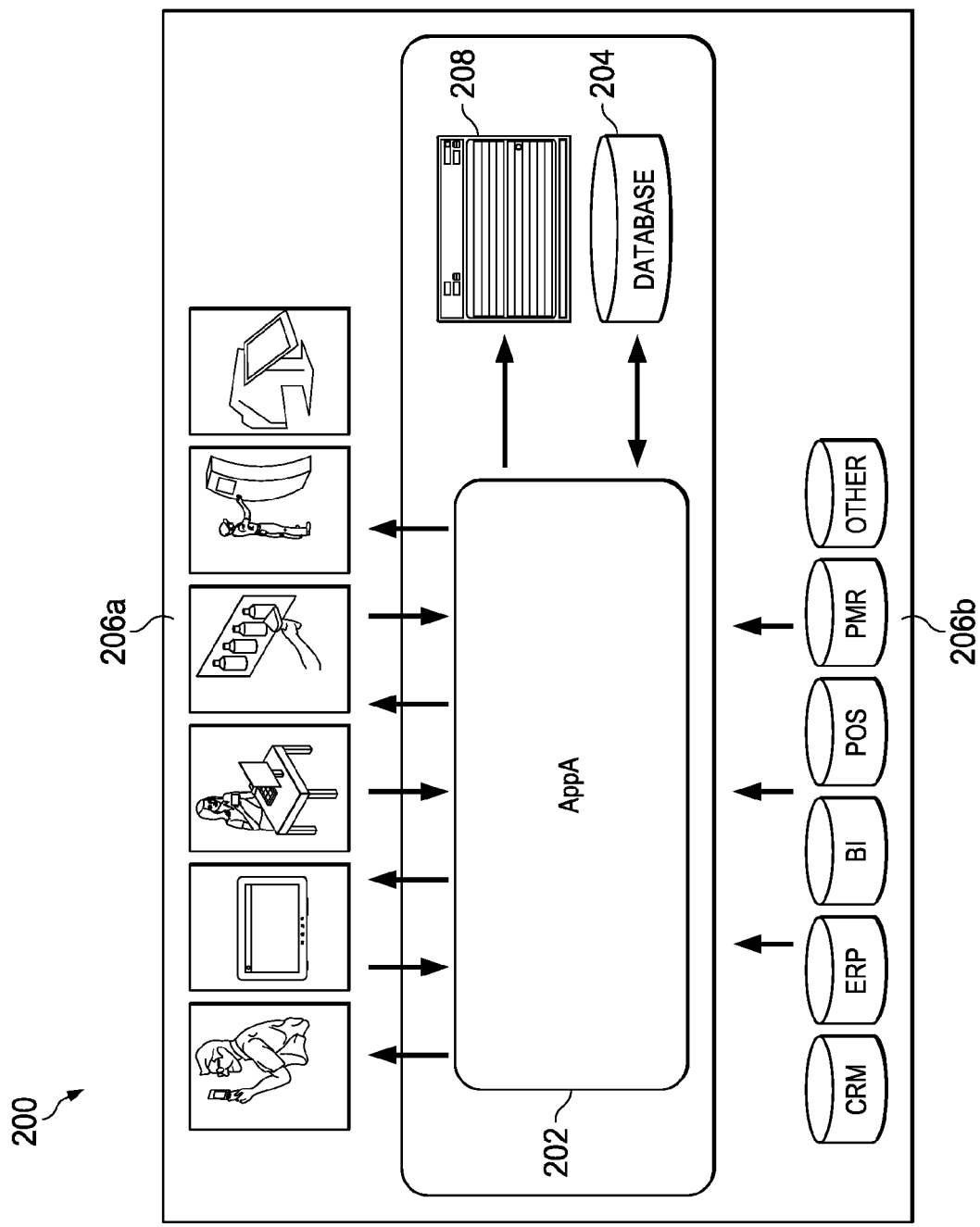
FIG. 2 is a high-level illustration of data interactions with application analytics (AppA) according to an implementation.

FIG. 2 is a high-level illustration of data interactions with application analytics (AppA) according to an implementation. As shown, AppA 202 is associated with a database 204 and supplied data for a dashboard 208 (or other type of data visualization) by events typically supplied by external applications and/or websites 206a accessed using a client application (described below). A given application needs to be related to a given database, for example though an API, a static configuration mechanism, external registration process, etc. In some implementations, AppA 202 can also be supplied data by internal/on-premises data sources 206b (e.g., customer relation management (CRM), enterprise resource planning (ERP), BI, etc.). As shown, developers can integrate API's into the external/internal data sources 204a/204b to generate data on "usage," for example, creation of a customer account on an external website can trigger the creation of an "event" (described more fully below). The received data/metadata can be dynamically integrated into database 204 and used immediately for dashboard 208 to allow analysis, etc. of data without an intermediate authoring step by specialized personnel (e.g., information technology, etc.).

An example client registration with AppA 202 and a structure of a received event can be illustrated by the following. Client registration is performed using an API and "registers" a client (e.g., application, website, etc.) with AppA 202 to receive events from the client. A sample client registration could be structured as:

```
// Register your client.
APPA.configure("projectId", "api key");
```

An example event structure definition (refer to FIG. 1) in JSON that is populated with data using an API to send from the client can be structured similar to:

```
// Build your fact properties as a JSON Object,
var fact = {
    month: { id: 1 },
    item: { id: "tablet" },
    ship_to: { id: "sap"},
    channel: { id: "x"},
    units: 256 };
```

Note that the provided example is of a very simple form. In other implementations, events will be provided with more dimensional information. It is important to note that the event structure should match the schema structure (e.g., snowflake, star, etc.). When the event structure doesn't match the schema structure, the discrepancy can be interpreted as a change in the data structure and dynamically trigger modification to the database schema and the related metadata.

To send a populated event data structure to AppA 202 (refer to FIG. 1), a client could call (using an API):

```
// Add your event to the facts table.
APPA.sendFact("projectId", fact);
```

SDKs and APIs can be implemented in any suitable language, for example JAVASCRIPT, Objective C, JAVA, etc.

Data received as part of the event object is dynamically stored in the database tables. In some implementations, data can be stored in several database tables (e.g., FIG. 1). Note that the example JSON object above maps very closely to the database schema detailed in FIG. 1. AppA 202 can derive and form the structure of the database schema based upon the structure of the received event data and metadata. In some implementations, the received event data object can provide elements (metadata, methods, etc.) used by the AppA 202 to define the structure of the database schema.

On reception of the events, an "input schema" is then seeded to a business intelligence query compiler (e.g., DaSL) which stores a description of the database schema and associated metadata (table names, column names, types, keys, joins, role of the tables, etc.) for use in executing queries to retrieve data stored in the database when requested. For example, using the example of FIG. 1, an end user could request how many units were sold by month and DaSL can properly retrieve the data stored in the database.

In some implementations, additional views can be created (e.g., database analytic, calculation, and/or attribute views); in other implementations, specific metadata such as business object universes need to be created. A DaSL input schema can be based on those views or additional metadata. These views/universes will be used later to perform the actual queries to the database (e.g., DaSL can generate queries in the appropriate format). This step is not strictly compulsory, since DaSL could also work directly on top of the database schema—in which case DaSL directly generates SQL queries. In other words, when there is a BI subsystem available, it should be set up at this point, so that DaSL can leverage it and produce dedicated queries.

The AppA 202 provides DaSL with appropriate metadata data (an input schema) in order for DaSL to understand what type of queries can be performed on the database (and through which language/formalism). Although not completely illustrated, the required metadata is derived from the event itself and used by AppA 202 to inform DaSL in advance how information is represented in the database. For example, AppA 202 can use, in some implementations, the name of the fields received in an event object to create the database tables used to store that information and inform DaSL of the database schema structure associated with that event and DaSL can generate a proper database (or BI subsystem) query based on the known structure of the database schema and the provided field names. In some implementation, it won't be possible to directly reuse the field names (for instance if they contain characters which are not acceptable as column names in the specific database), but in any case, AppA 202 will define and maintain a mapping between field names and column names. As an example, for a query for units shipped by ID (refer to FIG. 1), DaSL would generate a proper query to access the Product_Dim table 104b using the Item_ID primary key of the fact table 102 for any necessary information to complete the query.

Data storage and event structure could be, in some implementation, decoupled, as long as there is a mapping between both structures. The fact that the input schema more closely maps to the events received and the structure of the logic dependencies between different objects can also make administration more clear/understandable. DaSL queries are expressed in terms of attributes that need to be mapped to data structures and can hide details from end users. End users typically use tools (refer to FIG. 3B) to generate appropriate queries to DaSL for data retrieval. The tools introduce a level of abstraction between end users and DaSL.

Figure 3:
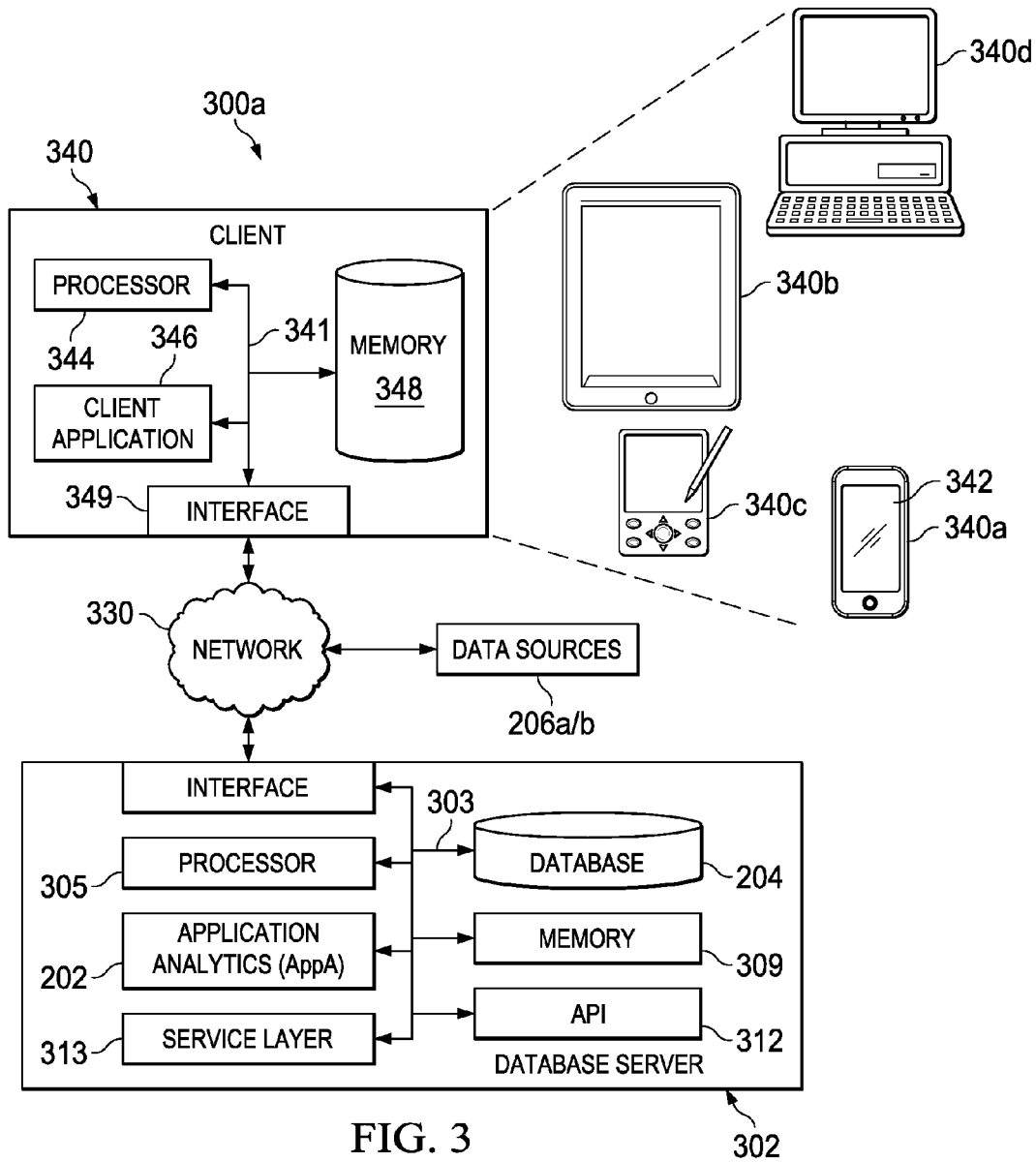
FIG. 3 is a block diagram illustrating an example distributed computing system (EDCS) for dynamic generation and modification of input schemas according to an implementation.

FIG. 3 is a block diagram illustrating an example distributed computing system (EDCS) 300 for dynamic generation and modification of input schemas according to an implementation. The illustrated EDCS 300 includes or is communicably coupled with database server (DBS) 302 and a client 340 that communicate across a network 330. In some implementations, one or more components of the EDCS 300 may be configured to operate within a cloud-computing-based environment (as illustrated in FIG. 3B below).

At a high level, the DBS 302 is an electronic computing device operable to receive, transmit, process, store, or manage data and information associated with the EDCS 300 using a database 204. In exemplary implementations, the database 204 is an in-memory database. An in-memory database 204 is a high-performance database management system (DBMS) that primarily relies on volatile electronic memory, such as random access memory (RAM), as opposed to magnetic, optical, removable, or other suitable non-electronic memory, for storage, retrieval, and processing of data. The reliance on electronic memory allows, in some implementations, for near-real-time aggregation, replication, synchronization, and processing of data. In some implementations, a persistency layer ensures that a copy of the in-memory database is maintained on non-volatile magnetic, optical, removable, or other suitable non-electronic memory in the event of a power or other system failure in order to allow recovery of the in-memory database. In other implementations, the database 204 can be a conventional database primarily relying on non-volatile magnetic, optical, removable, or other suitable non-electronic memory, for storage, retrieval, and processing of data. In some implementations, database server 402 can contain both a conventional database and an in-memory database that can share storage, processing, and other appropriate database functions.

In general, the DBS 302 is a server that provides application analytics capability/functionality. Specifically, the DBS 302 provides functionality for dynamic generation and modification of input schemas. The DBS 302 is responsible for at least receiving, among other things, requests, events, and/or data from one or more data sources 206a/b (e.g., accessed by client application 346 associated with the client 340) of the EDCS 300, analyzing and storing received data into an input schema, and providing data for end user tools to update data visualizations (e.g., a dashboard). In addition to requests received from the client 340, requests may also be sent to the DBS 302 from internal users, external or third-parties, other automated applications, as well as any other appropriate entities, individuals, systems, or computers. In some implementations, various requests can be sent directly to DBS 302 from a user accessing DBS 302 directly (e.g., from a server command console or by other appropriate access method). According to some implementations, the DBS 302 may also include or be communicably coupled with an e-mail server, a web server, a caching server, a streaming data server, a business intelligence (BI) server, and/or other server.

Each of the components of the DBS 302 can communicate using a system bus 303. In some implementations, any and/or all the components of the DBS 302, both hardware and/or software, may interface with each other and/or the interface 304 over the system bus 303 using an application programming interface (API) 312 and/or a service layer 313. The API 312 may include specifications for routines, data structures, and object classes. The API 312 may be either computer-language independent or dependent and refer to a complete interface, a single function, or even a set of APIs. The service layer 313 provides software services to the EDCS 300. The functionality of the DBS 302 may be accessible for all service consumers using this service layer. Software services, such as those provided by the service layer 313, provide reusable, defined business functionalities through a defined interface. For example, the interface may be software written in JAVA, C++, or other suitable language providing data in extensible markup language (XML) format or other suitable format.

While illustrated as an integrated component of the DBS 302 in the EDCS 300, alternative implementations may illustrate the API 312 and/or the service layer 313 as stand-alone components in relation to other components of the EDCS 300. Moreover, any or all parts of the API 312 and/or the service layer 313 may be implemented as child or sub-modules of another software module, enterprise application, or hardware module without departing from the scope of this disclosure. For example, the API 312 could be integrated into the AppA 202.

The DBS 302 includes an interface 304. Although illustrated as a single interface 304 in FIG. 3, two or more interfaces 304 may be used according to particular needs, desires, or particular implementations of the EDCS 300. The interface 304 is used by the DBS 302 for communicating with other systems in a distributed environment—including within the EDCS 300—connected to the network 330; for example, the client 340 as well as other systems communicably coupled to the network 330 (whether illustrated or not). Generally, the interface 304 comprises logic encoded in software and/or hardware in a suitable combination and operable to communicate with the network 330. More specifically, the interface 304 may comprise software supporting one or more communication protocols associated with communications such that the network 330 or interface's hardware is operable to communicate physical signals within and outside of the illustrated EDCS 300.

The DBS 302 includes a processor 305. Although illustrated as a single processor 305 in FIG. 3, two or more processors may be used according to particular needs, desires, or particular implementations of the EDCS 300. Generally, the processor 305 executes instructions and manipulates data to perform the operations of the DBS 302. Specifically, the processor 305 executes the functionality required for dynamic generation and modification of input schemas.

The DBS 302 also includes a memory 306 that holds data for the DBS 302, client 340, and/or other components of the EDCS 300. Although illustrated as a single memory 306 in FIG. 3, two or more memories may be used according to particular needs, desires, or particular implementations of the EDCS 300. While memory 306 is illustrated as an integral component of the DBS 302, in alternative implementations, memory 306 can be external to the DBS 302 and/or the EDCS 300.

At a high level, the AppA 202 is a one or more of any kind of software and/or hardware component providing functionality, as described above, for dynamic generation and modification of input schemas based on received events/data from external/internal data sources 206a/b. The AppA 202 can also be queried to provide visualization data. The structure of AppA 202 is described in more detail in FIG. 3B below.

Although illustrated as a single AppA 202, the AppA 202 may be implemented as multiple AppAs 202. In addition, although illustrated as integral to the DBS 302, in alternative implementations, the AppA 202 can be external to the DBS 302 and/or the EDCS 300 (e.g., wholly or partially executing on the client 340, other DBS 302 (not illustrated), etc.).

Once a particular AppA 202 is launched, the particular AppA 202 can be used, for example by one or more tools (e.g., client application 346) or other component of the EDCS 300 to interactively process a task, event, data, request, response, etc. In some implementations, the AppA 202 may be a network-based, web-based, and/or other suitable application consistent with this disclosure.

In some implementations, a particular AppA 202 may operate in response to and in connection with at least one request received from components of another DBS 302, and/or any component of the EDCS 300 (whether illustrated or not). In some implementations, the AppA 202 can be accessed and executed in a cloud-based computing environment using the network 330. In some implementations, a portion of a particular AppA 202 may be a web service associated with the AppA 202 that is remotely called, while another portion of the AppA 202 may be an interface object or agent bundled for processing by any suitable component of the EDCS 300. Moreover, any or all of a particular AppA 202 may be a child or sub-module of another software module or application (not illustrated) without departing from the scope of this disclosure. Still further, portions of the particular AppA 202 may be executed or accessed by a user working directly at the DBS 302, as well as remotely at a corresponding client 340. In some implementations, the DBS 302 or any suitable component of DBS 302 or the EDCS 300 can execute the AppA 202.

The client 340 may be any computing device operable to connect to or communicate with at least the DBS 302 and to provide functionality for dynamic generation and modification of input schemas according to an implementation. In general, the client 340 comprises an electronic computing device operable to receive, transmit, process, and store any appropriate data associated with the EDCS 300, for example, the AppA 202. More particularly, among other things, the client 340 can upload events associated with the client application 146 to the DBS 302 for integration into the AppA 202 and/or database 204. The client typically includes a processor 344, a client application 346, a memory 348, and/or an interface 349 interfacing over a system bus 343.

The client application 346 is any type of application that allows the client 340 to navigate to/from, request, view, create, edit, delete, administer, and/or manipulate content associated with the DBS 302, including visualizing data. For example, the client application 346 can present visualization data to an end user generated by the AppA 202 responsive to a query made though the client application 346. The client application can also send application/website event data (external data 206a) to the DBS 302 for dissemination to the appropriate components of DBS 302, in particular the AppA 202 and the database 204. In some implementations, the client application 346 can use parameters, metadata, and other information received at launch to access a particular set of data from the DBS 302 and/or other components of the EDCS 300. Once a particular client application 346 is launched, a user may interactively visualize data and process a task, event, or other information associated with the DBS 302 and/or other components of the EDCS 300. In some implementations, the client application 346 can also be used perform administrative functions related to the AppA 202 (refer to FIG. 3B). In some implementations, client application 346 can serve as one or more of the following: application/web site, an administrative browser, a dashboard tool, an office productivity suite, other data visualization tool, and/or other tool/application.

In some implementations, the client application 346 can be a native application. In some implementations, the client application 346 can be a general access application, for example a browser (or including) a web browser. In some implementations, the client application 346 can be a native application that provides additional features and/or functions not normally provided on non-native client applications 346. Native applications typically are more closed in nature with tighter security and therefore allow the additional features and/or functionality that a non-native client application 346 is prohibited from providing. Further, although illustrated as a single client application 346, the client application 346 may be implemented as multiple client applications in the client 340. For example, there may be a native client application and a web-based (e.g., HTML) client application, and the like depending upon the particular needs of the client 340. For example, a user could access the AppA 202 using a native client application 346 while access to an external website would be allowed with either the native client application 346 or a non-native client application 346 (e.g., a browser).

The interface 349 is used by the client 340 for communicating with other computing systems in a distributed computing system environment, including within the EDCS 300, using network 330. For example, the client 340 uses the interface to communicate with a DBS 302 as well as other systems (e.g., data sources 206*a*/b) that can be communicably coupled to the network 330. The interface 349 may be consistent with the above-described interface 304 of the DBS 302. The processor 344 may be consistent with the above-described processor 305 of the DBS 302. Specifically, the processor 344 executes instructions and manipulates data to perform the operations of the client 340, including the functionality required to send events and requests to the DBS 302, receive and process responses from the DBS 302, and to visualize data.

The memory 348 typically stores objects and/or data associated with the purposes of the client 340 but may also be consistent with the above-described memory 306 of the DBS 302 or other memories within the EDCS 300 and be used to store data similar to that stored in the other memories of the EDCS 300 for purposes such as backup, caching, and the like.

Further, the illustrated client 340 includes a GUI 342 that interfaces with at least a portion of the EDCS 300 for any suitable purpose. For example, the GUI 342 (illustrated as associated with client 340*a*) may be used to view data associated with the client 340, the DBS 302, or any other component of the EDCS 300. In particular, in some implementations, the client application 346 may act as a GUI interface for the AppA 202 and/or other components of DBS 302.

There may be any number of clients 340 associated with, or external to, the EDCS 300. For example, while the illustrated EDCS 300 includes one client 340 communicably coupled to the DBS 302 using network 330, alternative implementations of the EDCS 300 may include any number of clients 340 suitable to the purposes of the EDCS 300. Additionally, there may also be one or more additional clients 340 external to the illustrated portion of the EDCS 300 that are capable of interacting with the EDCS 300 using the network 330. Further, the term "client" and "user" may be used interchangeably as appropriate without departing from the scope of this disclosure. Moreover, while the client 340 is described in terms of being used by a single user, this disclosure contemplates that many users may use one computer, or that one user may use multiple computers.

The illustrated client 340 (example configurations illustrated as 340*a*-340*d*) is intended to encompass any computing device such as a desktop computer, laptop/notebook computer, wireless data port, smart phone, personal data assistant (PDA), tablet computing device, one or more processors within these devices, or any other suitable processing device. For example, the client 340 may comprise a computer that includes an input device, such as a keypad, touch screen, or other device that can accept user information, and an output device that conveys information associated with the operation of the DBS 302 or the client 340 itself, including digital data, visual and/or audio information, or a GUI 342, as illustrated specifically with respect to the client 340*a*.

Figure 4:
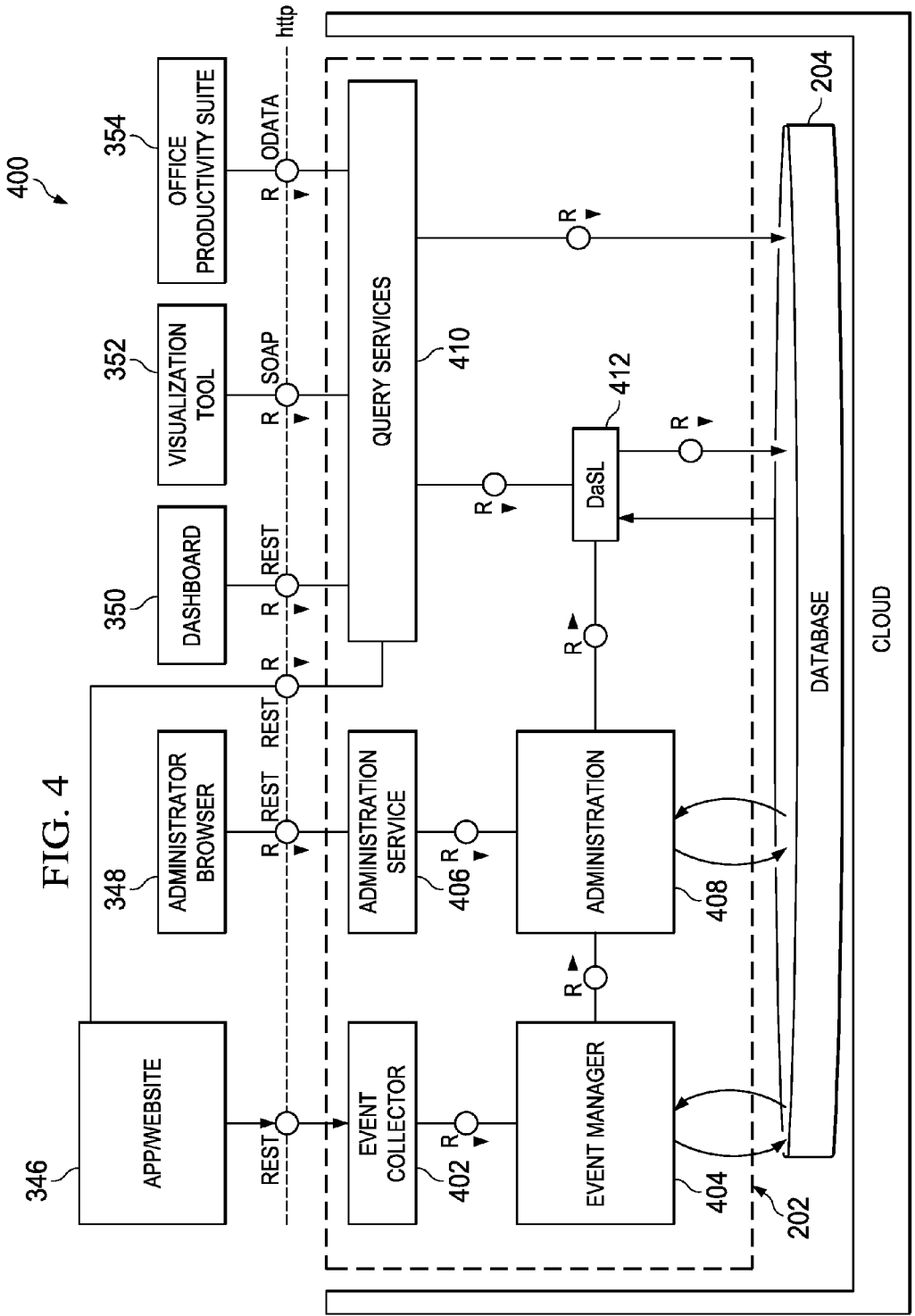
FIG. 4 is a block diagram illustrating detail of the AppA of FIGS. 2 and 3 according to an implementation.

FIG. 4 is a block diagram 400 illustrating detail of the AppA of FIGS. 2 and 3 according to an implementation. AppA 202 is made up of an event collector 402, event manager 404, administration service 406, administration component 408, query services 410, and DaSL engine 412.

The event collector 402 receives event information from a data source (e.g., an application and/or website 346) and transmits the received data to the event manager 404. In some implementations, data sources register with the event collector 402 to transmit event data to the event collector using the above mentioned API.

The event manager 404 and administration component 408 are used to analyze events/data received from the event collector 402, optionally determine whether BI views/universes associated with received data need to be updated, and/or check for changes in the database schema (e.g., fact and/or dimension tables) or the need to create a new database schema if one does not exist to hold data/metadata received in a message. If no changes to the underlying database schema are detected or a new database schema is not needed, the event manager 404 stores data/metadata received in events/data to the database 204 using an existing database schema. If, however, changes to the underlying database schema are detected or a new database schema is needed, the event manager 404 delegates the task to the administration component 408. The administration component 408 can create a new database schema, manage changes to existing database schemas, and manage data obsolescence, data security, and storage of event data/metadata. For example if the administration component 408 receives data requiring modification of a database schema where the source of the data does not have security to update an existing database schema, the task will be blocked. The administration component 408 can also update database schemas based on obsolete data/structures. The administration component 408 can also create/update views or universes. The administration component 408 also provides the DaSL component 412 with input database schema information including the structure of data to store. The DaSL component 412 stores this information for use to respond to received queries from the query services 410.

The administration service 406 is used to handle administrative requests received from a client (e.g., a browser using client application 346). The administration service 406 manages security for administrative tasks and allows/prohibits task requests appropriately. End users can use the administration service 406 to see what data structures have been created, modify and/or create new input schemas, and other appropriate tasks consistent with this disclosure.

The DaSL component 412 (acting as a query generation engine) provides services to generate low-level native queries (e.g., SQL or other native queries) to the database 204 from high-level DaSL queries received from one or more tools 346 through the query services 410. In some implementations, the DaSL component 412 can be adapted to different query engine types. For example, the DaSL component 412 can generate SQL to access database views, Business Objects queries to access universes, SQL to directly access database tables, etc. In some implementations, a single stand-alone DaSL query can be used to express data for an entire dashboard, analytic, or document. In some implementations, the query services 410 translate queries received in various formats/protocols (REST, SOAP, OData, etc.) into a common query format. The DaSL component 412 uses the information stored from the Administration component 408 to structure appropriate low-level native queries responsive to a received DaSL query. The database 402 returns datasets to the DaSL component 412 which are then transmitted to the requestor (e.g., dashboard, visualization tool, office productivity suite, application, website, etc.) through the query services 410.

In some implementations, any piece of data underlying a calculation or an analytic can be modeled as a stand-alone, re-usable DaSL expression that retains sound semantics including when used in a different tool 346. Personal business objects replace mandatory pre-authored model elements (e.g., hierarchical dimensions, custom dimensions, restricted measures, calculations, etc.) by DaSL equivalents (input schemas) generated on-the-fly that are storable and re-usable. This dynamic generation enables instant re-use of their definitions. Model authoring is also reduced to a minimum, and changes in the model can be accommodated dynamically. Using DaSL constructs embedded in or deduced from a tool's own representation enables interoperability across tools and encourages a white-box type of behavior.

Figure 5:
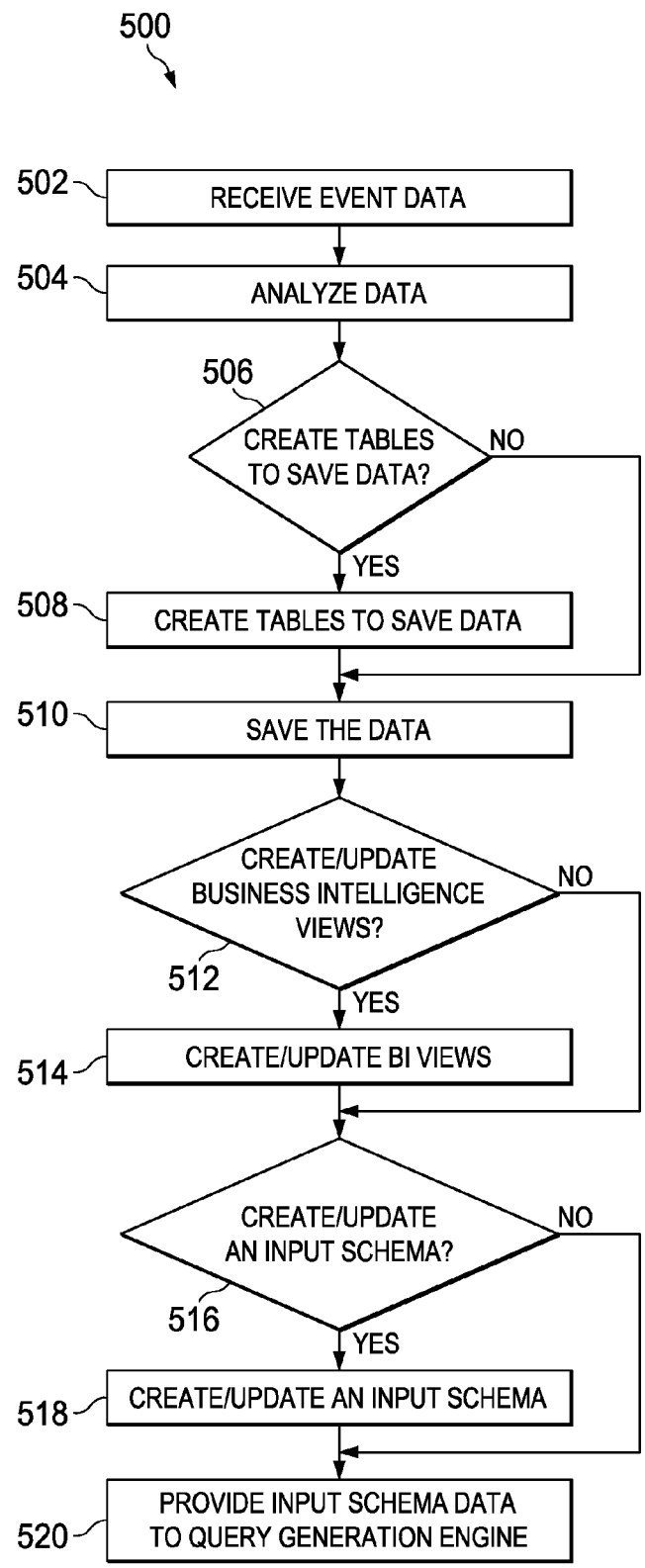
FIG. 5 is a flow chart illustrating a method for dynamic generation and modification of input schemas according to an implementation.

FIG. 5 is a flow chart illustrating a method 500 for dynamic generation and modification of input schemas according to an implementation. For clarity of presentation, the description that follows generally describes method 500 in the context of FIGS. 1, 2, 3, and 4. However, it will be understood that method 500 may be performed, for example, by any other suitable system, environment, software, and hardware, or a combination of systems, environments, software, and hardware as appropriate. In some implementations, various steps of method 500 can be run in parallel, in combination, in loops, or in any order.

At 502, event data is received by an application analytics (AppA) event collector from an internal and/or external data source, for example an application or website that has registered with the AppA to transmit events/data to the event collector. In some implementations, the received event/event data can be processed prior to forwarding the data to an event manager. For example, the event collector can perform data conversion on received event data. From 502, method 500 proceeds to 504.

At 504, the received event data is transmitted to the event manager/administration component for analysis. From 504, method 500 proceeds to 506.

At 506, a determination is made as to whether database tables need to be created to save the received data. In some implementations, the event manager can make the determination. In other implementations, the administration component or a combination of both the event manager and the administration component can make the determination. If it is determined that the additional database tables are needed to store the received data, method 500 proceeds to 508. If additional database tables are not needed to store the received data, method 500 proceeds to 510.

At 508, the administration component creates requests to generate necessary tables of an input schema to store the received data. In some implementations, the administration component can then initiate storage of the received data into the created database tables. In other implementations, the administration component delegates storage of the data wholly or partially to the event manager. From 508, method 500 proceeds to 510.

At 510, in some implementations, the event manager can initiate storage of the received data into the created database tables. In other implementations, the event manager delegates storage of the data wholly or partially to the administration component. From 510, method 500 proceeds to 512.

At 512, a determination is made as to whether business intelligence (BI) views need to be created/updated based on the received and saved event data. In some implementations, the event manager can make the determination. In other implementations, the administration component or a combination of both the event manager and the administration component can make the determination. If it is determined that BI views need to be created/updated based on the received and saved event data, method 500 proceeds to 514. If BI views do not need to be created/updated based on the received and saved event data, method 500 proceeds to 516.

In the case of Business Objects universes, at 512, a creation of modification of universe is performed. The creation/modification has an impact on the creation of the input schema. Queries are generated as Business Objects queries and handled by a Business Objects runtime (not illustrated) instead of being generated as SQL statements or calculation scenarios.

At 514, the administration component initiates updates of BI views in the database associated with the received and saved event data. From 514, method 500 proceeds to 516.

At 516, a determination is made as to whether an input schema needs to be created/updated based on the received and saved event data. In some implementations, the event manager can make the determination. In other implementations, the administration component or a combination of both the event manager and the administration component can make the determination. If it is determined that an input schema needs to be created/updated based on the received and saved event data, method 500 proceeds to 518. If an input schema does not need to be created/updated based on the received and saved event data, method 500 proceeds to 520.

At 518, the administration component initiates creation/updates of an input schema based on the received and saved event data and associated the stored event data with the created/updated input schema. From 514, method 500 proceeds to 520.

At 520, the administration component provides the input schema to a query response engine (e.g., the data specification language (DaSL) engine) for later use to recover requested data based on received queries. After 520, method 500 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving a first set of event data in a first event structure from a remote computing data source with an event collector, wherein the remote computing data source is registered with the event collector to transmit event data to the event collector;
transmitting the received first set of event data for analysis;
saving the transmitted first set of event data;
determining whether to create or update a business intelligence view based on the saved first set of event data;
creating an input schema based on the saved first set of event data; and
providing, by a computer and for storage, the created input schema derived from the saved first set of event data and proactively describing how data is represented in the database and what type of queries can be performed on the database and required particular language formalisms to a query generation engine for later use in retrieving data from the database upon receipt of a high-level query request from the remote computing data source or another remote computing data source, wherein the query generation engine dynamically generates a query generation engine expression corresponding to the input schema, and wherein the query generation engine provides computing services to generate low-level native database queries from the high-level query request for compatibility with the database;

receiving a second set of event data in a second event structure from the remote computing data source, the second event structure different from the first event structure;

transmitting the received second set of event data for analysis;

saving the transmitted second set of event data;

dynamically modifying the input schema in response to a determination that the second event structure of the saved second set of event data differs from the structure of the created input schema; and providing, by the computer and for storage, an updated input schema as modified based on the saved second set of event data.

2. The method of claim 1, further comprising pre-processing the received event data before transmitting the sets of event data for analysis.

3. The method of claim 1, further comprising analyzing the transmitted event data to determine whether to create database tables to save the event data.

4. The method of claim 1, further comprising creating or updating a business intelligence view.

5. The method of claim 1, further comprising transmitting a query to a database, the query generated by the query generation engine based on an input schema associated with the received event data.

6. The method of claim 1, further comprising translating a received query into a common query format to transmit to the query generation engine.

7. A non-transitory, computer-readable medium storing computer-readable instructions executable by a computer and operable to:
receive a first set of event data in a first event structure from a remote computing data source with an event collector, wherein the remote computing data source is registered with the event collector to transmit event data to the event collector;
transmit the received first set of event data for analysis;
save the transmitted first set of event data;
determine whether to create or update a business intelligence view based on the saved first set of event data;
create an input schema based on the saved first set of event data;
provide for storage the created input schema derived from the saved first set of event data and proactively describing how data is represented in the database and what type of queries can be performed on the database and required particular language formalisms to a query generation engine for later use in retrieving data from the database upon receipt of a high-level query request from the remote computing data source or another remote computing data source, wherein the query generation engine dynamically generates a query generation engine expression corresponding to the input schema, and wherein the query generation engine provides computing services to generate low-level native database queries from the high-level query request for compatibility with the database;
receive a second set of event data in a second event structure from the remote computing data source, the second event structure different from the first event structure;
transmit the received second set of event data for analysis;
save the transmitted second set of event data;
dynamically modify the input schema in response to a determination that the second event structure of the saved second set of event data differs from the structure of the created input schema; and
provide, by the computer and for storage, an updated input schema as modified based on the saved second set of event data.

8. The medium of claim 7, further comprising instructions operable to pre-process the received sets of event data before transmitting the event data for analysis.

9. The medium of claim 7, further comprising instructions operable to analyze the transmitted event data to determine whether to create database tables to save the event data.

10. The medium of claim 7, further comprising instructions operable to create or update a business intelligence view.

11. The medium of claim 7, further comprising instructions operable to transmit a query to a database, the query generated by the query generation engine based on an input schema associated with the received event data.

12. The medium of claim 7, further comprising instructions operable to translate a received query into a common query format to transmit to the query generation engine.

13. A system, comprising:
at least one computer interoperably coupled with a memory storage and configured to:
receive a first set of event data in a first event structure from a remote computing data source with an event collector, wherein the remote computing data source is registered with the event collector to transmit event data to the event collector;
transmit the received first set of event data for analysis;
save the transmitted first set of event data;
determine whether to create or update a business intelligence view based on the saved first set of event data;
create an input schema based on the saved first set of event data;
provide for storage the created input schema derived from the saved first set of event data and proactively describing how data is represented in the database and what type of queries can be performed on the database and required particular language formalisms to a query generation engine for later use in retrieving data from the database upon receipt of a high-level query request from the remote computing data source or another remote computing data source, wherein the query generation engine dynamically generates a query generation engine expression corresponding to the input schema, and wherein the query generation engine provides computing services to generate low-level native database queries from the high-level query request for compatibility with the database;
receiving a second set of event data in a second event structure from the remote computing data source, the second event structure different from the first event structure;
transmitting the received second set of event data for analysis;
saving the transmitted second set of event data;

dynamically modifying the input schema in response to a determination that the second event structure of the saved second set of event data differs from the structure of the created input schema; and providing, by the computer and for storage, an updated input schema as modified based on the saved second set of event data.

14. The system of claim 13, further configured to pre-process the received event data before transmitting the event data for analysis.

15. The system of claim 13, further configured to analyze the transmitted event data to determine whether to create database tables to save the event data.

16. The system of claim 13, further configured to create or update a business intelligence view.

17. The system of claim 13, further configured to transmit a query to a database, the query generated by the query generation engine based on an input schema associated with the received event data.

18. The system of claim 13, further configured to translate a received query into a common query format to transmit to the query generation engine.

* * * * *